(12) United States Patent
Du Plessis et al.

(10) Patent No.: US 7,246,489 B2
(45) Date of Patent: Jul. 24, 2007

(54) POSITION CONTROL ACTUATOR SYSTEM

(75) Inventors: Andries J. Du Plessis, Arlington, MA (US); Alexander W. Jessiman, Weymouth, MA (US); Gert J. Muller, Arlington, MA (US)

(73) Assignee: Mide Technology Corporation, Medford, MA (US)

( * ) Notice: Subject to any disclaimer, the term of this patent is extended or adjusted under 35 U.S.C. 154(b) by 43 days.

(21) Appl. No.: 10/787,666

(22) Filed: Feb. 26, 2004

(65) Prior Publication Data

US 2004/0206922 A1 Oct. 21, 2004

Related U.S. Application Data

(60) Provisional application No. 60/450,153, filed on Feb. 26, 2003.

(51) Int. Cl.
*F01B 29/10* (2006.01)

(52) U.S. Cl. ............... 60/528; 251/129.1; 251/129.06; 310/26

(58) Field of Classification Search ............ 251/129.03–129.1; 310/26; 318/118; 335/215; 60/528, 527
See application file for complete search history.

(56) References Cited

U.S. PATENT DOCUMENTS

| | | | | |
|---|---|---|---|---|
| 4,611,632 A | * | 9/1986 | Kolchinsky et al. | ... 137/625.65 |
| 4,772,807 A | * | 9/1988 | Bouvot | ............ 307/119 |
| 4,779,582 A | * | 10/1988 | Lequesne | ............ 123/90.11 |
| 5,284,220 A | * | 2/1994 | Shimizu et al. | ............. 180/441 |
| 5,958,154 A | | 9/1999 | O'Handley et al. | |
| 6,157,101 A | | 12/2000 | Ullakko | |
| 6,474,353 B1 | | 11/2002 | Sturman et al. | |
| 6,515,382 B1 | | 2/2003 | Ullakko | |
| 6,654,316 B1 | * | 11/2003 | Butler et al. | ................ 367/157 |
| 6,803,846 B2 | * | 10/2004 | Ohta et al. | .................. 335/215 |
| 2002/0117906 A1 | | 8/2002 | Ullakko | |
| 2003/0079472 A1 | * | 5/2003 | Hara et al. | .................... 60/527 |

OTHER PUBLICATIONS

A.A. Likhachev and K. Ullakke, *Magnetic-Field-Controlled Twin Boundaries Motion and Giant Magneto-Mechanical Effects in Ni-Mn-Ga Shape Memory Alloy*, Physics Letters A 275, Oct. 2, 2000, pp. 142-151.

S.J. Murray et al., *Giant Magnetic-field-induced Strain in Ni-Mn-Ga Crystals: Experimental results and modeling*, (2001) Journal of Magnetism and Magnetic Materials 226-230, pp. 945-947.

* cited by examiner

*Primary Examiner*—Eric Keasel
*Assistant Examiner*—Andrew J. Rost
(74) *Attorney, Agent, or Firm*—Iandiorio & Teska

(57) ABSTRACT

A position control actuator system includes a control element and first and second actuators. The first and second actuators are each comprised of magneto-active twinned material. The first actuator is configured to extend and drive the control element in a first direction when the first actuator is subjected to a magnetic field. The second actuator is configured to extend and drive the control element in a second direction when the second actuator is subjected to a magnetic field. A magnetic field source subsystem is configured to extend the first actuator to drive the control element in the first direction, and extend the second actuator to drive the control element in the second direction.

1 Claim, 11 Drawing Sheets

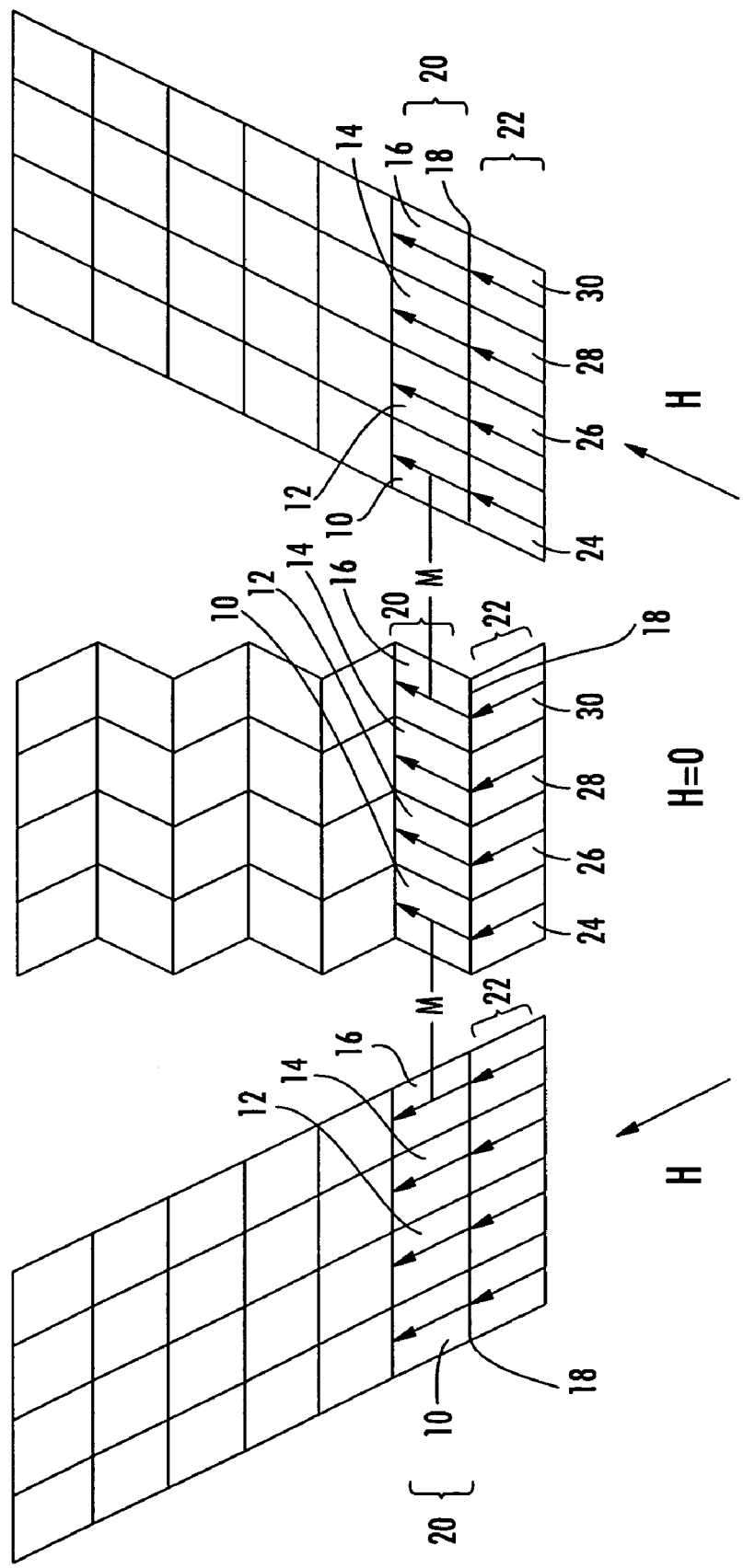

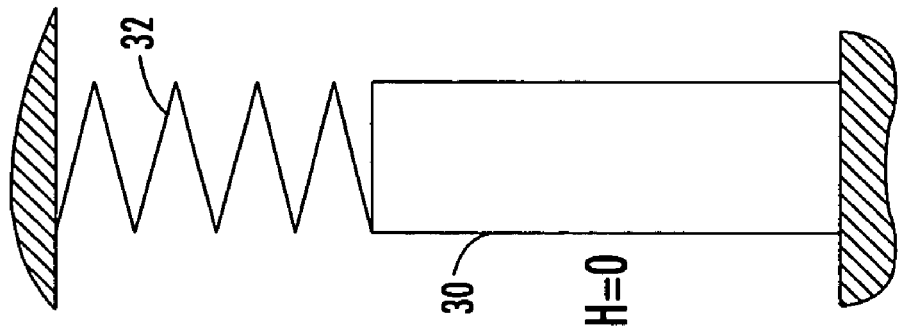
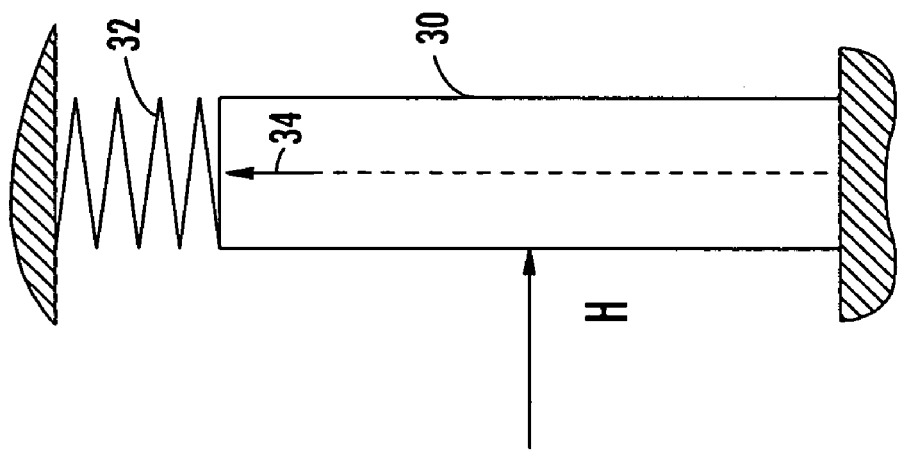
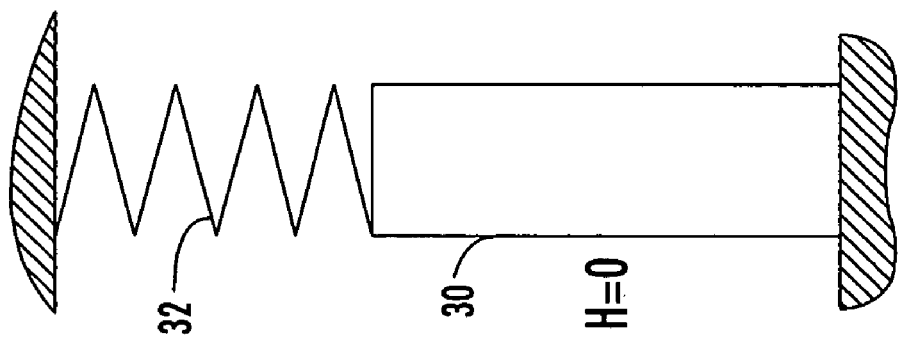

POSITION CONTROL ACTUATOR SYSTEM

RELATED APPLICATIONS

This application claims benefit of U.S. Provisional Patent Application Ser. No. 60/450,153 filed Feb. 26, 2003, which is fully incorporated herein by reference.

FIELD OF THE INVENTION

This invention relates to a position control actuator system utilizing magneto-active twinned material as actuator elements that drive a control element when the magneto-active twinned material actuator elements are subjected to a magnetic field.

BACKGROUND OF THE INVENTION

Actuators are useful in a number of devices including but not limited to fluidic and pneumatic control valves. Fluidic and pneumatic control valves are commonly used as components of power control and distribution circuits for stationary and mobile power equipment, as well as industrial process control systems.

Fluid control valves can be categorized into valves with discrete positions, such as open, neutral (locked) or closed, or proportional valves where the controlled variable, such as flow, is proportional to the magnitude of the control or input signal. A number of valve types are commercially available, including spool valves, butterfly valves, and poppet valves.

In spool valves, spool control is typically achieved through moving a solenoid core (a spool) through electromagnetic coil actuation. Spool valves can be of the 2-position, 3-position, or proportional type (independent of the number of ports connected to the valve). In a 2-position valve, the spool (or other control device) is in one of two extreme positions during operation. When the coil is energized, the spool is moved to either the completely closed or the completely open position, without controlling the position as the spool moves from the one position to the next. If the valve has latching capabilities, valve control is maintained in the most recent condition without the application of continuous external power.

A 3-position valve adds a neutral central position to the 2-position layout. This achieves functionality such as driving a hydraulic ram forward, backwards, or locking it into place at the third, neutral position. In some environments, the ideal flow control valve is a proportional control valve, where the position of the control device can be controlled accurately to achieve not only open, closed or neutral but also by varying degrees of open and closed.

U.S. Pat. No. 6,474,353, incorporated herein by reference, describes an on/off latching solenoid control valve, with a neutral position to lock all ports, typifying it as a 3-position valve. Electromagnetic coils are used to shuttle the valve spool between the two extreme spool positions. Coil magnetization provides the force to move the spool into the desired position, while at the same time magnetizing the spool. Remnant magnetization in the spool causes the spool to latch onto the energized coil body, thus retaining spool position when the coil is de-energized. This latching effect produces a no-power hold condition that limits electrical power consumption during spool movement. Detachment from the coil body is achieved by sending a small current through the appropriate coil to unlatch the spool to enable springs to move the spool into a neutral position.

However, valves controlled by a solenoid have several disadvantages. Solenoid actuation is limited in terms of the time required to open or close the spool (also referred to as the actuation frequency). Actuation frequencies are generally low. The inertia of the spool and the solenoid core limit the spool traveling time. In order to reduce the traveling time, the movable mass must be reduced.

As an alternative to solenoid actuation, spool movement is also achieved through the use of solid-state actuation materials such as piezoelectric, electrostrictor, and magnetostrictive materials. These actuation materials produce strain directly in response to an externally applied electric or magnetic field. However, use of these materials has its own disadvantages. For example, most solid-state actuation materials produce very low levels of strain. As a result, these materials do not find wide application in valves where large control device displacements are required.

Overall, currently known actuator systems tend to cover the extremes of stroke-force domain with either very little stroke at high force, or high stroke at low force levels. For general industrial actuation applications including many known valves, servo-flap drivers and injectors, it is necessary to devise complex stroke gaining mechanisms to improve the stroke capability, which comes at added cost and complexity.

Therefore, it would be advantageous to have a large strain, solid-state actuator material system with high actuation frequency force, over a wide frequency band, with simple driving mechanisms, especially for use in valve systems.

One type of known material, namely magneto-active twinned material (MATM), sometimes also referred to as ferromagnetic shape memory alloy (FSMA), magnetic shape memory alloy (MSMA) or magnetically controllable memory alloy (MCMA), is a class of solid state active materials that satisfies the need for high frequency and large stroke actuation at appreciable force levels. The actuation is caused by a phase transformation in the material, based on twin boundary motion, which is driven by an externally applied stress or magnetic field.

Such materials provide large strains in response to external stimuli. U.S. Pat. No. 5,958,154, incorporated herein by reference, describes a general class of magneto-active twinned materials that provide large actuation strains at high actuation rates based on an externally applied magnetic field. This class of materials exhibits a twinned martensitic crystal structure below a characteristic phase transformation temperature. The magnetocrystalline anisotropy energy levels of the material allow for twin boundary motion through the application of an external magnetic field. The twin boundary motion allows switching of the twins in the structure of the material, resulting in a macroscopic straining of the material.

However, typical known actuator arrangements utilizing such materials also utilize mechanical devices, such as springs, to provide mechanical stress to return the actuator material to its original condition. In such a system, power needs to be supplied continuously, for instance, to keep a valve open. This continuous power application wastes electrical power and generates heat in the valve, thus creating drawbacks and failing to take full advantage of the properties of the material in the context of position control actuator systems.

SUMMARY OF THE INVENTION

It is therefore an object of this invention to provide an improved position control actuator system.

It is a further object of this invention to provide a position control actuator system with no-power hold to lock the system elements in position and to provide lower power consumption over the total operating envelope.

It is a further object of this invention to provide a position control actuator system with either 2-position, 3-position or proportional type control capability.

It is a further object of this invention to provide a position control actuator system that provides actuator position determination.

It is a further object of this invention to provide a position control actuator system that, in one embodiment, can be used as a valve.

The invention results from the realization that an improved position control actuator system can be achieved by providing magneto-active twinned material actuator elements to drive a control element when each of the actuator elements is subjected to magnetic fields, and to provide a no-power hold to lock the control element in position in the absence of magnetic fields.

This invention features a position control actuator system including a control element, and first and second actuators, the first and second actuators each comprised of magneto-active twinned material. The first actuator is configured to extend and drive the control element in a first direction when the first actuator is subjected to a magnetic field, and the second actuator is configured to extend and drive the control element in a second direction when the second actuator is subjected to a magnetic field. A magnetic field source subsystem is configured to extend the first actuator to drive the control element in the first direction, and extend the second actuator to drive the control element in the second direction. The first and second directions may be opposite directions. The magnetic field source subsystem may include at least one magnetic field source for each actuator, and the magnetic field source subsystem may include a pair of coils for each actuator. The magnetic field source subsystem may be structured and arranged to extend the first actuator and the second actuators alternately, or the magnetic field source subsystem may be structured and arranged to extend the first and second actuators simultaneously. The first direction may be toward the second actuator, and the control element may be configured to compress the second actuator when the first actuator extends. The second direction may be toward the first actuator, and the control element may be configured to compress the first actuator when the second actuator extends.

In one example, the position control actuator system may include a controller operable to energize the magnetic field subsystem. The magnetic field source subsystem may include at least a first electromagnetic coil wound to produce a magnetic field transversely through the first actuator, and may include at least a second electromagnetic coil wound to produce a magnetic field transversely through the second actuator. The control element may have opposing ends in contact with the first and second actuators, and the control element may include at least one passage therethrough. The control element may include at least one valve head and it may be monolithic. The control element may be comprised of a first portion which does not project into magnetic fields generated by the magnetic field subsystem and at least a second portion that does project into magnetic fields generated by the magnetic field subsystem. The first portion may be comprised of composite material, and the second portion may be comprised of non-magnetic material. In one example, the control element may be comprised of aluminum.

The position control actuator system may include at least one actuator comprised of ferromagnetic shape memory alloy, or magnetically controllable memory alloy. The magneto-active twinned material of at least one actuator is preferably configured to permit movement of twin boundaries therein.

The position control actuator system may include a housing about the control element and the actuators. The housing may include at least one flow port therethrough, and at least one passage in the control element may be in communication with one flow port in the housing. The center point of the control element may be in a neutral position. The housing may include portions about the first and second electromagnetic coils, in which those portions may be comprised of magnetic material such as silicon iron.

The position control actuator may also include an end cap for inhibiting movement of the first actuator in a direction away from the control element, and a second end cap for inhibiting movement of the second actuator in a direction away from the control element. The endcaps may be comprised of non-magnetic material such as aluminum. The controller may include a processor structured and arranged to determine the position of the control element based on the inductance of one of the actuators, and the processor may apply a voltage input step signal to at least one magnetic field source in the magnetic field subsystem to measure electrical current time response of the at least one magnetic field to determine the inductance. The control element may be a spool, or a poppet, and the poppet may have at least one end which may be a valve head that seats in a valve seat of a stopper element.

This invention further features a position control actuator system including a control element and first and second actuators each comprised of magneto-active twinned material. The first actuator may be configured to drive the control element to compress the second actuator when the first actuator is subjected to a magnetic field. The second actuator may be configured to drive the control element to compress the first actuator when the second actuator is subjected to a magnetic field. A magnetic field source for each actuator may be configured to extend the first actuator, drive the control element in one direction, and compress the second actuator, and to extend the second actuator, drive the control element in another direction, and compress the first actuator.

This invention also features a position control actuator system including a control device having opposing ends, at least first and second actuators, one at each of the opposing ends of the control device, the actuators comprised of magneto-active twinned material configured to permit movement of twin boundaries therein, and at least first and second magnetic field sources, one for each of the actuators. The magnetic field sources may be structured and arranged to apply at least one magnetic field to at least one of the actuators for driving the control device between the actuators.

This invention further features a position control actuator system including a control element and at least first and second actuator elements. Each of the actuator elements may be comprised of magneto-active twinned material configured to permit movement of twin boundaries therein and may include at least first and second magnetic field sources, one for each of the actuator elements. A controller may be structured and arranged to generate signals to one or both of the magnetic field sources to apply a magnetic field to at least one of the actuator elements to drive the control element between the actuator elements.

This invention also features a position control actuator system including a control element and at least first and second actuator elements. Each of the actuator elements may be comprised of magneto-active twinned material configured to permit movement of twin boundaries therein, and a magnetic field source may apply a magnetic field to at least one of the actuator elements for driving the control element.

This invention further features a spool valve including a spool having opposing ends, and at least first and second actuators, one at each of the opposing ends of the spool. The actuators may be comprised of magneto-active twinned material configured to permit movement of twin boundaries therein. At least first and second magnetic field sources, one for each of the actuators, may be structured and arranged to apply at least one magnetic field to at least one of the actuators for extending at least one of the actuators and for driving the spool between said actuators. A body may surround the spool and the actuators. The body may include endcaps for inhibiting extension of the actuator elements in a direction away from the spool, and the endcaps may be comprised of non-magnetic material. The body may further include at least one flow port for fluid flow through the body. The spool may include at least one flow passage therethrough for fluid flow through the spool. At least one flow port in the body may be in communication with at least one flow passage in the spool, or no flow passage in the spool may be in communication with a flow port in the body. The spool valve may further include a controller operable to energize the first and second magnetic field sources, and the first and second magnetic field sources may each be comprised of electromagnetic coils. The spool may be comprised of non-magnetic material at the opposing ends.

This invention also features a poppet valve including a poppet having a valve head, and at least first and second actuators, one at each of the opposing ends of the poppet. The actuators may be comprised of magneto-active twinned material configured to permit movement of twin boundaries therein. At least first and second magnetic field sources, one magnetic field source for each actuator, may be structured and arranged to apply a magnetic field to at least one of the actuators for driving the poppet. A stopper element having a valve seat for receiving the valve head of the poppet may control fluid flow. The actuators may be in contact with the poppet, and the actuators may be configured about opposing ends of said poppet. The magnetic field sources may include electromagnetic coils.

The invention further features a method of actuating a control element driven by first and second actuators each comprised of magneto-active twinned materials, the method including subjecting the first actuator to a magnetic field to extend the first actuator, drive the control element in one direction, and compress the second actuator, and subjecting the second actuator to a magnetic field to extend the second actuator, drive the control element in another direction, and compress the first actuator. The method may further include energizing at least one of the magnetic fields with signals from a controller. The first actuator may be subjected to a transverse magnetic field. Also the second actuator may be subjected to a transverse magnetic field. The first actuator may be fully extended or partially extended. The second actuator may be fully extended or partially extended.

This invention also features a method of position control actuation, the method including driving a control element with a first actuator to compress a second actuator by subjecting the first actuator to a magnetic field, and driving the control element with the second actuator to compress the first actuator by subjecting the second actuator to a magnetic field. Applying a magnetic field to the first actuator extends the first actuator, drives the control element in one direction, and compresses the second actuator, and applying a magnetic field to the second actuator extends the second actuator, drives the control element in another direction, and compresses the first actuator. The first actuator may be fully compressed or partially compressed. The second actuator may be fully compressed or partially compressed.

This invention further features a method of position control actuation, the method including providing a control element having opposing ends, disposing the control element between a first actuator and a second actuator, the first and second actuators comprised of magneto-active twinned material configured to permit movement of twin boundaries, and applying at least one magnetic field to at least one of the first and second actuators for driving the control element between the first and second actuators.

This invention also features a method of actuating a spool of a spool valve driven by first and second actuators each comprised of magneto-active twinned materials, the method including subjecting the first actuator to a magnetic field to extend the first actuator, drive the spool in one direction, and compress the second actuator, and subjecting the second actuator to a magnetic field to extend the second actuator, drive the spool in another direction, and compress the first actuator. The method of actuating a spool of a spool valve may further include energizing at least one of the magnetic fields with signals from a controller. The step of subjecting the first actuator to a magnetic field may include subjecting the first actuator to a transverse magnetic field. The step of subjecting the second actuator to a magnetic field may include subjecting the second actuator to a transverse magnetic field. The method of actuating a spool of a spool valve may further include disposing an endcap adjacent one end of the first actuator to inhibit extension of the first actuator in a direction away from the spool, and may further include disposing an endcap adjacent one end of the second actuator to inhibit extension of the second actuator in a direction away from the spool.

This invention further features a method of spool valve actuation, the method including providing a spool having opposing ends, disposing the spool between a first actuator and a second actuator, the first and second actuators comprised of magneto-active twinned material configured to permit movement of twin boundaries, and applying at least one magnetic field to at least one of the first and second actuators for driving the spool between the first and second actuators.

This invention also features a method of poppet valve actuation, the method including providing a valve body including a valve head and first and second opposing ends, disposing a stopper element including a valve seat opposite the valve head, where the valve seat may be configured to receive the valve head, and disposing first and second actuators at the opposing ends of the valve body. A magnetic field may be applied to at least one of the actuators for driving the valve body between the actuators. The step of applying a magnetic field to the first actuator element may drive the valve body in a first direction wherein the valve head seats in the valve seat. The step of applying a magnetic field to the second actuator element may drive the valve body in a second direction wherein the valve head moves in a direction away from the valve seat. The step of applying a magnetic field to each of the first and second actuator elements may position the valve body in a neutral position.

This invention further features a method of poppet valve actuation, the method including providing a poppet having opposing ends, disposing the poppet between a first actuator and a second actuator, the first and second actuators comprised of magneto-active twinned material configured to permit movement of twin boundaries, and applying at least one magnetic field to at least one of the first and second actuators for driving the poppet between the first and second actuators.

BRIEF DESCRIPTION OF THE DRAWINGS

Other objects, features and advantages will occur to those skilled in the art from the following description of a preferred embodiment and the accompanying drawings, in which:

FIGS. 1A, 1B and 1C are schematic illustrations of unit cells of the magneto-active twinned material for use with the subject invention, which show turning of the martensitic twin variants when an external magnetic field is applied;

FIGS. 2A, 2B and 2C are schematic views of the states of a magneto-active twinned material in a conventional extensional actuator arrangement;

DISCLOSURE OF THE PREFERRED EMBODIMENT

Figure 3:
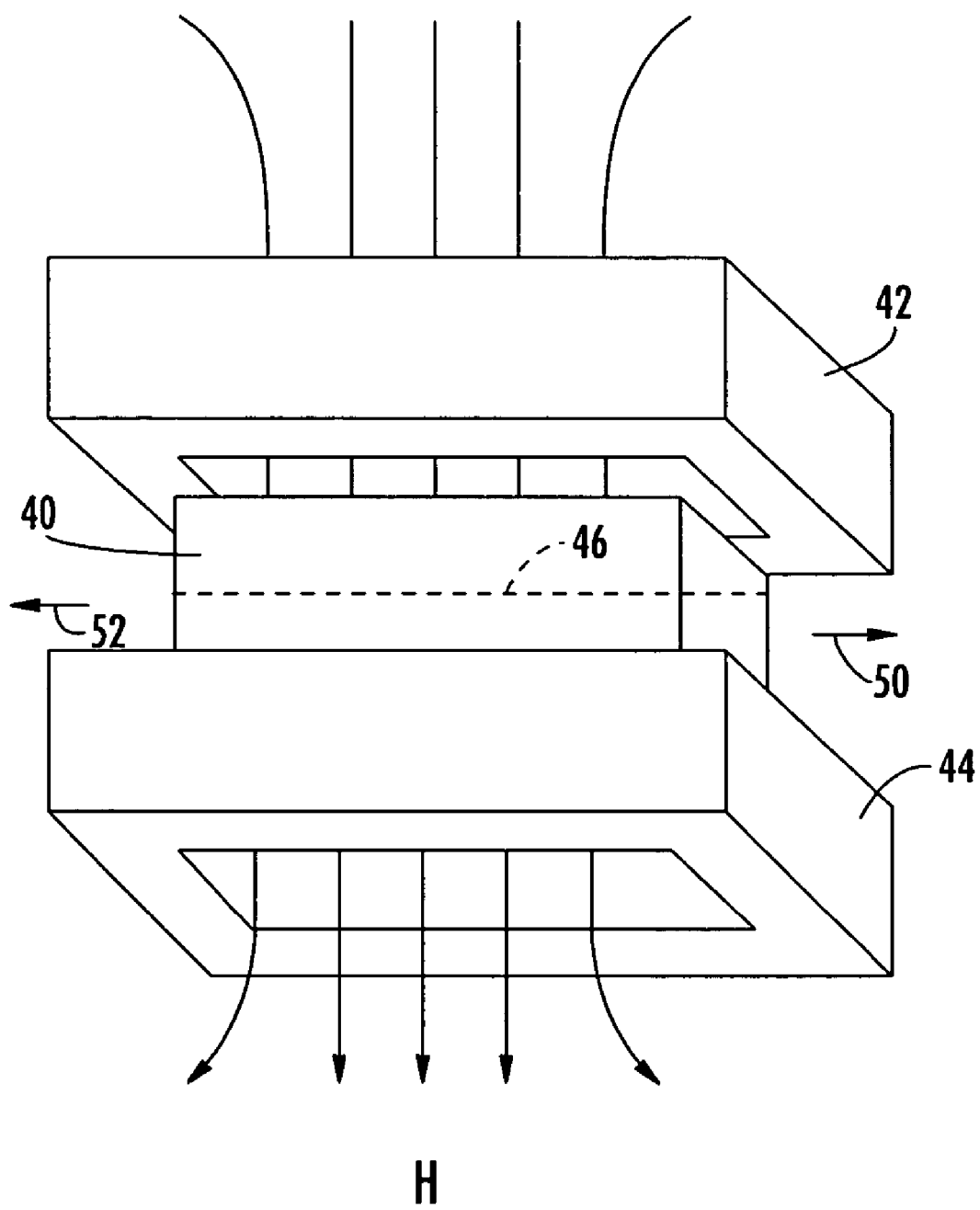
FIG. 3 is a schematic view of a typical electromagnetic coil arrangement that may be used to produce a transverse magnetic field in the magneto-active twinned material.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

As discussed in the Background of the Invention section above, there exists a general class of magneto-active twinned materials that provide large actuation strains at high actuation rates, based on an externally applied magnetic field. FIGS. 1A-1C show two-dimensional illustrations of the twin re-orientation of such materials.

In the absence of an applied magnetic field, magnetization vectors M, FIG. 1A, of unit cells 10, 12, 14 and 16 are aligned with the direction known to those of ordinary skill in the art as the "easy" magnetization axis. As is shown in FIG. 1A, the magnetization vectors of twin variant 20, which includes unit cells 10, 12, 14 and 16, are different than the magnetization vectors of twin variant 22 which includes unit cells 24, 26, 28, and 30. Twin boundary 18 is the boundary between the two different twin variants 20 and 22. Notably, a boundary between unit cells that are of the same twin variant (not shown) is not considered a twin boundary.

In the presence of magnetic field H, FIG. 1B, magnetization vectors M of unit cells 10, 12, 14 and 16 of twin variant 20 align with magnetic field H, and thus turn as shown. On a macroscopic scale, this twin transformation results in a shape change of the material (i.e., longitudinal extension), leading to an actuation stroke. An orientation different than that of FIG. 1B, achieved by applying a different magnetic field, is shown in FIG. 1C.

Notably also, the application of mechanical force to such materials, as opposed to magnetic force, also results in turning of the magnetization vectors M of the unit cells. For example, while a transverse magnetic field applied to the material will lead to longitudinal extension of the material, a sufficient longitudinal compressive mechanical force applied to the material in its extended state will not only return the material to its original length, but it will also turn the magnetization vectors M to their original orientation. Further details of the twin re-orientation are described in detail in U.S. Pat. No. 6,157,101, which is incorporated herein by reference. Examples of known magneto-active twinned material include but are not limited to Ni—Mn—Ga, Fa—Pd, and the Co—Ni—Ga alloy systems.

For this class of materials, twin transformation is not an elastic effect. The transformation is retained once the magnetic field is removed. Therefore, in a typical extensional actuator arrangement using this class of material, a magnetic field is applied transverse to the longitudinal axis of a slender actuator element, expanding the element. Thereafter, mechanical force, such as force supplied by a spring, provides the compressive force necessary to return the actuator element to its original state.

As shown in FIG. 2A, in the absence of an applied magnetic field, H=0, actuator element 30 has a fixed length, and spring 32 provides little to no compressive force. When magnetic field H is applied, FIG. 2B, actuator element 30 is strained in the longitudinal direction 34, thereby compressing spring 32. Thereafter, compressive mechanical stress from spring 32 is used to return actuator element 30 to its original length and condition, FIG. 2C. Without the application of the return force of spring 32, actuator element 30 would retain the strain that was induced by magnetic field H, and thus remain extended. This is known as no-power hold, which is particularly suitable for devices such as latching control valves, relays, and optical switches.

FIG. 3 illustrates in schematic form how a magnetic field can be produced in such an actuator system. Actuator element 40 is placed between electromagnetic coils 42 and 44. Electromagnetic coils 42, 44 generate magnetic field H in the direction shown, which is transverse to the longitudinal axis 46 of actuator element 40. If actuator element is comprised of magneto-active twinned material, actuator 40 will be extended longitudinally in directions 50 and 52 when it is subjected to magnetic field H. Alternative actuator element arrangements for a number of different devices are further discussed in U.S. Pat. No. 6,515,382, which is incorporated herein by reference.

As noted above, without the application of a return force, the magneto-active material would retain the strain induced by the original magnetic field and prior known devices have provided this return force by mechanical means such as springs.

By way of overview, the position control actuator system and method of the present invention, which may be embodied in a spool valve in one example, controls the positioning of a control element or spool through the use of magnetically controlled magneto-active actuator elements. While the subject invention is not limited to valve systems, one typical system includes a valve having a valve body with flow ports that can be connected in different arrangements. A spool or control element is used to connect different flow ports to achieve flow control. By changing the location of the control element or valve, different flow conditions can be achieved. Two opposing spool displacement actuators drive the control element or spool. The displacement actuators are controlled by associated magnetic field sources, i.e. electromagnetic coils, which generate the required actuation magnetic fields. These actuator elements, which include magneto-active material, strain in response to an externally applied magnetic field. Energizing the first actuator element moves the spool into the desired position, while at the same time compressing the opposing actuator element. To change the control element position the alternate actuator is energized, which drives the control element into an alternate position while compressing the first actuator element. By energizing both actuators at the same time, the control elements are locked in the central, neutral position. Proportional position control is achieved by varying the current levels in the electromagnetic coils. In another aspect of the invention, the relationship between the magneto-active actuator element strain condition and the magnetic permeability of an actuator element can be used to determine the position of the control element through inductance measurements, and this information can be used for informational or positional feedback purposes.

Figure 4:
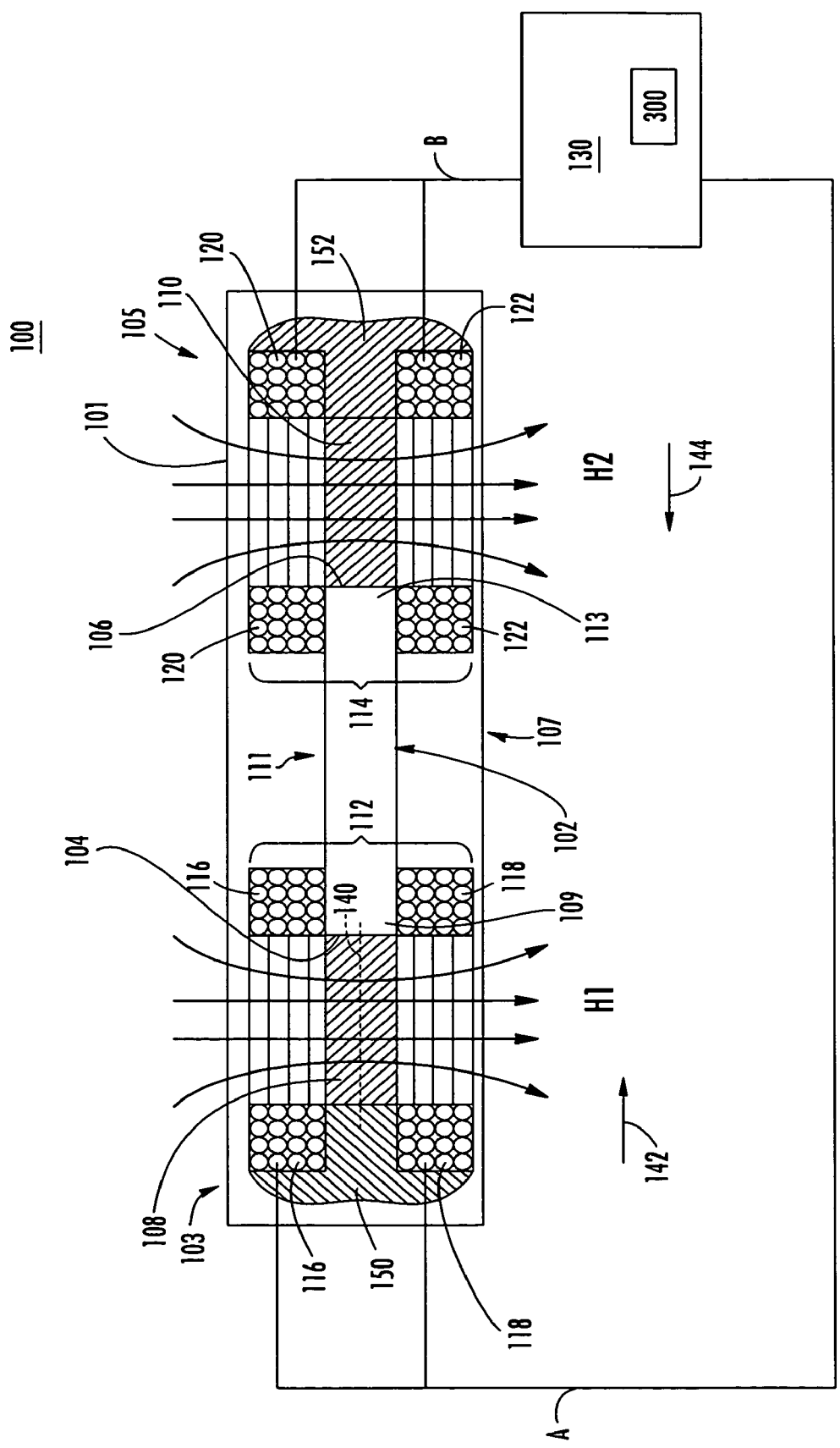
FIG. 4 is a schematic cross-sectional view of one possible position control actuator system in accordance with the present invention.

A cross-sectional view of a position control actuator 100 in accordance with the present invention is shown schematically in FIG. 4. Two opposing actuators or actuator elements 108 and 110 are used to control the displacement of control element or control device 102, which may be a valve control device as described herein below. Control element 102 has opposing ends 104, 106. Actuator element 108 is at one end of control element 102, and actuator element 110 is at the other end of control element 102. As shown, actuator element 108 is at opposing end 104, while actuator element 110 is at opposing end 106. In this example, control element 102 is monolithic but this is not a limitation of the subject invention. Also, actuator elements are shown in direct contact with control element 102, but this also is not a limitation of the subject invention.

Each actuator element 108 and 110 is comprised of magneto-active twinned material, and the structure of such material is such that it allows for movement of the twin boundaries therein when a magnetic field is applied, as discussed above. Actuator elements 108 and 110 may be comprised of magneto-active twinned material (MATM), ferromagnetic shape memory alloy (FSMA), magnetic shape memory alloy (MSMA), magnetically controllable memory alloy (MCMA), or a combination of these, and/or any other material exhibiting these properties, whether now known or yet to be discovered. At the time of set-up of position control actuator 100, the magnetization vectors of the unit cells of actuator elements 108 and 110 are typically randomly oriented in the cell's local easy magnetization axis, and thus actuator elements 108 and 110 are neither fully extended nor fully compressed.

In accordance with the invention, a magnetic field subsystem including for example, magnetic field sources 112 and 114, is configured to extend actuator element 108 to drive control element 102 in first direction 142, and to extend actuator element 110 to drive control element 102 in second direction 144. In a preferred embodiment, the magnetic field source subsystem includes magnetic field source 112 associated with actuator element 108 and magnetic field source 114 associated with actuator element 110. Magnetic field sources 112 and 114 are used to supply magnetic fields transverse to actuator elements 108 and 110, respectively, in order to strain, and thus extend, the actuator elements. As shown, electromagnetic field sources 112 and 114 can produce magnetic fields H1 and H2, respectively.

Controller 130 is connected to the magnetic field sources and is configured to generate signals to either magnetic field source 112 or magnetic field source 114, or to both magnetic fields sources 112 and 114. In this example, magnetic field source 112 typically includes electromagnetic coils 116 and 118, and magnetic field source 114 typically includes electromagnetic coils 120 and 122. Other means known to those skilled in the art for generating and supplying magnetic fields may also be used in accordance with the subject invention. Also, as it is known in the art, electromagnetic coils 116, 118 and 120, 122 may be wound on bobbins (not shown), which may be rectangular, and the bobbins may contain a magnetic pole piece and magnetic housing to complete the magnetic path.

In one embodiment, actuator element 108 is between electromagnetic coils 116, 118, and actuator element 110 is between electromagnetic coils 120, 122. Activation of coils 116 and 118 by controller 130 generates magnetic field H1, and activation of coils 120 and 122 by controller 130 generates magnetic field H2.

In operation, control element 102 is driven or moved between actuator elements 108 and 110. In the presence of magnetic field H1, actuator element 108 extends and control element 102 is displaced toward actuator element 110, compressing it. To displace control element 102 toward actuator element 108, actuator element 110 is subjected to magnetic field H2 and it extends, thus driving control element 102 toward actuator element 108 and compressing it. Additionally, by energizing magnetic fields H1 and H2 simultaneously, control element 102 can be forced to a central position between actuator elements 108 and 110. Moreover, by controlling the magnitude of magnetic fields H1 and H2, the displacement of control element 102 can be controlled proportionally, so as to place control element 102 at any position between actuator elements 108 and 110.

Preferably, when power to the coils is removed, control element 102 is locked in place by virtue of the no-power hold nature of the magneto-active material structure of actuator elements 108 and 110.

Details of the operation of the invention are as follows. When controller 130 generates signal A to magnetic field source 112, magnetic field source 112 generates magnetic field H1. The magnetization vectors of the unit cells in actuator element 108 align with magnetic field H1 and thus turn as illustrated schematically in FIGS. 1A and 1B. On a macroscopic scale, this twin transformation results in a shape change of actuator element 108. As shown, the application of magnetic field H1 transverse to the longitudinal dimension 140 of actuator element 108 results in a longitudinal extension of actuator element 108 in the direction indicated by arrow 142, thus driving control element 102 towards actuator element 110. End cap or stopper 150 inhibits extension of actuator element 108 in direction 144 when actuator element 108 is subjected to magnetic field H1 and control element 102 is driven toward and compresses actuator element 110. End cap or stopper 152 prevents actuator element 110 from moving in direction 142 resulting in the compression of actuator element 110 by control element 102. Thus, when actuator element 108 is subjected to magnetic field H1, the full actuation stroke of actuator element 108 causes control element 102 to compress actuator element 110.

In similar fashion, when controller 130 outputs signal B to activate only magnetic field source 114, it produces magnetic field H2. The resulting extension of actuator element 110 drives control element 102 toward actuator element 108, compressing it. End cap or stopper 152 inhibits extension of actuator element 110 in direction 142 when actuator element 110 is subjected to magnetic field H2 and control element 102 is driven toward and compresses actuator element 108. End cap or stopper 150 prevents actuator element 108 from moving in direction 144 resulting in the compression of actuator element 108 by control element 102. Thus, when actuator element 110 is subjected to magnetic field H2, the actuation stroke of actuator element 110 causes control element 102 to compress actuator element 108.

Alternatively, by activating and controlling each of magnetic fields H1 and H2, proportional control of position control actuator system 100 may be achieved. Accordingly, control element 102 may be driven to any number of points between actuator elements 108 and 110 and would not be limited to the extreme positions of full actuation strokes of actuator elements 108 and 110. In one example, controller 130 sends signals A and B to magnetic field sources 112 and 114 at the same time. When the signals are such that magnetic field H1 is greater than magnetic field H2, actuator 108 drives control element 102 towards actuator element 110, but in this case actuator element 110 is only partially compressed because actuator element 108 has not undergone a full actuation stroke. In another example, where magnetic field H2 is greater than H1, actuator 110 drives control element 102 toward actuator element 108, thus partially compressing actuator element 108. By balancing magnetic fields H1 and H2, control element 102 can be driven to any point between actuator elements. One position available for control element 102 to occupy is a position where actuator elements 108 and 110 are compressed to the same degree, or a neutral position.

A preferred embodiment includes housing 101, having portions 103 and 105 that surround electromagnetic coils 116, 118 and 120, 122, with housing portions 103 and 105 comprised of magnetic material such as high permeability silicon iron. Portion 107 of housing 101 may be comprised of any suitable material, and in one embodiment portion 101 is comprised of heat treatable carbon steel. Portions 109 and 113 of control element 102 that project into magnetic fields H1 and H2, respectively, and end caps 150 and 152, are preferably comprised of non-magnetic material such as aluminum, non-magnetic stainless steel, titanium, or a nickel-based alloy. Portion 111 of control element 102 that does not project into magnetic fields H1 and H2 may be comprised of any suitable material including composite material. Thus, it can be seen that control element 102 may be comprised of different materials and portions. In one example, control element 102 is monolithic and comprised of aluminum.

Controller 130 may include processor 300 structured and arranged to determine the position of control element 102 from the inductance measured in either one of actuator elements 108 or 110. It is known that the magnetic permeability of the actuator element comprised of the magneto-active twinned material used in this invention varies as a function of the level of strain of that actuator element. By measuring the inductance of the non-powered actuator element, the permeability and consequently the level of strain of the actuator element can be determined. Once the level of strain of this non-powered actuator element is known, the length of the actuator element, and thus the specific position of the control element, can be determined. This information can be used for feedback control purposes. In particular, processor 300 may be structured and arranged to measure the electrical current time response of magnetic field source 112, by applying a small voltage input step signal, where the voltage is small enough that it does not induce additional straining of actuator element 108. Then, the known relationship between these physical properties is used to provide a determination of the control element position and means for feedback.

Figure 5:
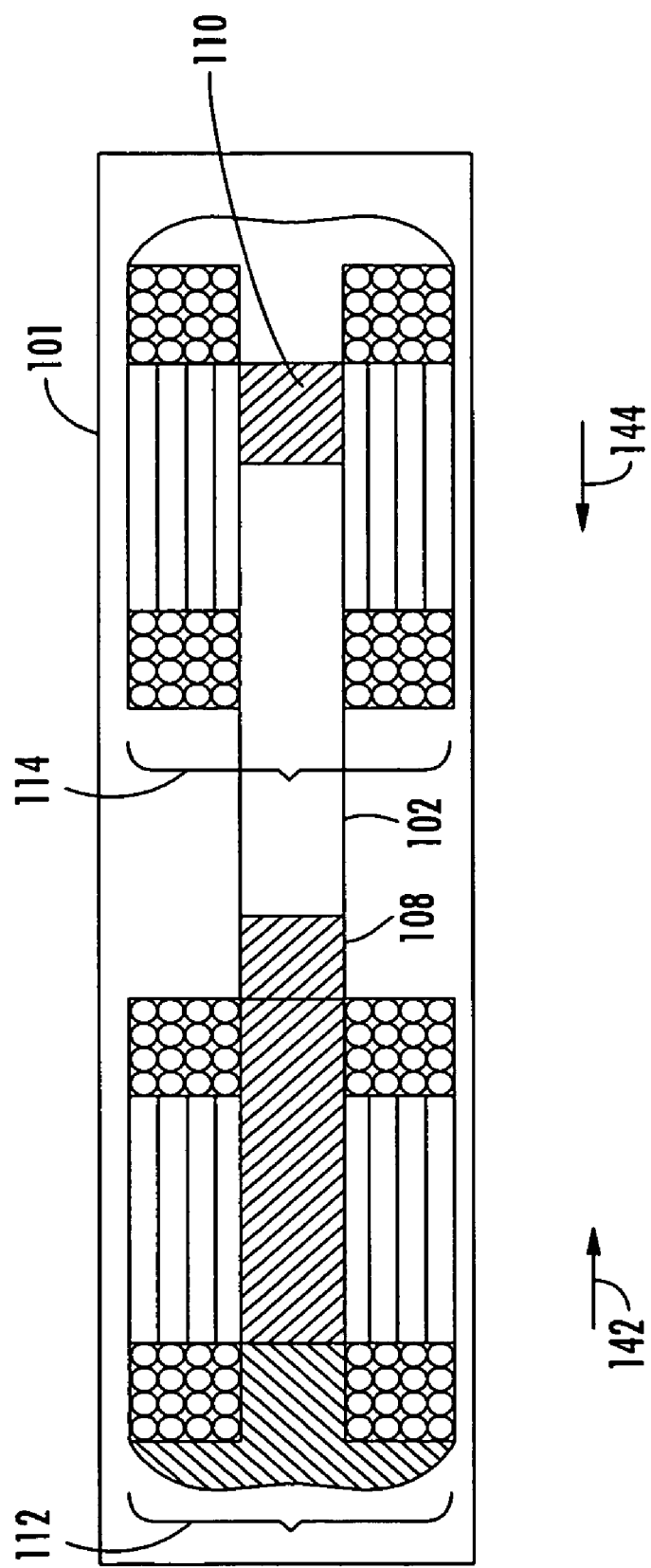
FIG. 5 is a schematic cross-sectional view of the position control actuator system of FIG. 4 illustrating the no-power hold condition.

FIG. 5 illustrates the no-power hold position after actuator element 108 has extended and driven control element 102 in direction 142, and magnetic field H1 is no longer being applied. Without a countering mechanical, electromagnetic or other force in direction 144, actuator element 108 will remain extended and actuator element 110 will remain compressed. That is, once the actuation stroke has been effected, no additional power is required to keep actuator element 108 extended, and consequently, no additional power is required to keep control element 102 in position. It will be apparent to one of ordinary skill in the art that a "reverse" no-power hold condition results (not shown) when magnetic field source 114 (only) is activated. Namely, actuator element 110 is subjected to magnetic field H2, actuator element 110 extends, control element 102 is driven in direction 144, and actuator element 108 is compressed. This no-power hold feature is especially useful for certain desired applications, i.e. latching valve applications.

The present invention has a particular application in fluidic and pneumatic control valves. In one embodiment, a spool valve 200 and method, FIG. 6, includes housing or body 202 which surrounds spool 204, including passages 206 and 208 through which fluid may flow. Body 202 includes flow ports 210, 212 and 214 through which fluid may also flow. For example, fluid may flow into flow port 210 and out of either flow ports 212 or 214, although this not a limitation of the invention. Moreover, it would be apparent to one of ordinary skill in the art that body 202 may include any number of flow ports, and that spool 204 may include any number of passages, in different arrangements, to achieve the flow control desired. Body 202 serves as a housing, and may also provide the magnetic return path for magnetic fields.

The structure and operation of spool valve 200 is analogous to position control actuator system 100, FIG. 5, described above, and the following description of the spool valve incorporates the principles of position control actuator system 100. Spool 204, FIG. 6, has opposing ends 220 and 222. Actuators or actuator elements 224 and 226 are comprised of magneto-active twinned material structured to permit movement of twin boundaries therein, such as magneto-active twinned material (MATM), ferromagnetic shape memory alloy (FSMA), magnetic shape memory alloy (MSMA), magnetically controllable memory alloy (MCMA), a combination of these, and/or any other material exhibiting these properties. Actuator element 224 is at spool end 220, and actuator element 226 is at spool end 222. As shown, opposing ends 220 and 222 of spool 204 are in contact with actuator elements 224 and 226, respectively, but this is not a limitation of the invention. There may be other structure or space between the spool and the actuator element without resulting change to the operation of the spool valve.

A magnetic field source subsystem includes, for example, magnetic field sources 229 and 235. In a preferred embodiment, magnetic field source 229 is comprised of electromagnetic coils 230 and 232, actuator element 224, and housing 202. Magnetic field source 235 is comprised of electromagnetic coils 236 and 238, actuator element 226, and housing 202. Body 202 surrounds each of spool 204, actuator elements 224 and 226, and electromagnetic coils 230, 232, 236 and 238. Controller 260 is configured to generate signals A and/or B to one or both magnetic field sources, i.e. to electromagnetic coils 230, 232, and/or electromagnetic coils 236, 238, to apply magnetic fields H1 and/or H2 to at least one of actuator elements 224 and 226 for driving spool 204. End cap or stopper 250 inhibits extension of actuator element 224 in direction 255 when actuator element 224 is subjected to magnetic field H1 and spool 204 is driven or moved toward and compresses actuator element 226. End cap or stopper 252 prevents actuator element 226 from moving in direction 256 resulting in the compression of actuator element 226 by spool 204. It will be apparent that the roles of end caps 250 and 252 will be reversed when only magnetic field H2 is activated.

It will be understood by those of ordinary skill in the art that there may be many flow ports in the valve body, and many flow passages in the spool, which may be in communication with one another and open, or partially open, or not in communication, i.e. shut, in accordance with the particular need for such a valve. U.S. Pat. No. 6,474,353 shows a number of such flow ports and passages, with a number of alignments, and it is hereby incorporated herein by reference, although the present invention is not limited to any particular number of ports or passages. Preferably, portions 203 and 205 of valve body or housing 202 that surround electromagnetic coils 230, 232, 236, and 238 are comprised of magnetic material, such as high permeability silicon iron. Portion 211 of housing 202 may be comprised of any suitable material including composite material, and in one embodiment portion 211 is comprised of heat treatable carbon steel. Portions 207 and 209 of spool 204 that project into the magnetic fields H1 and H2, and end caps 250 and 252, are preferably comprised of non-magnetic material such as as aluminum, non-magnetic stainless steel, titanium, or a nickel-based alloy. Portion 213 of spool 204 that does not project into the magnetic fields of the magnetic field subsystem may be comprised of any suitable material including composite material. It can be seen that spool 204 may be comprised of different materials and portions. In one example, spool 204 is monolithic and comprised of aluminum.

Figure 7:
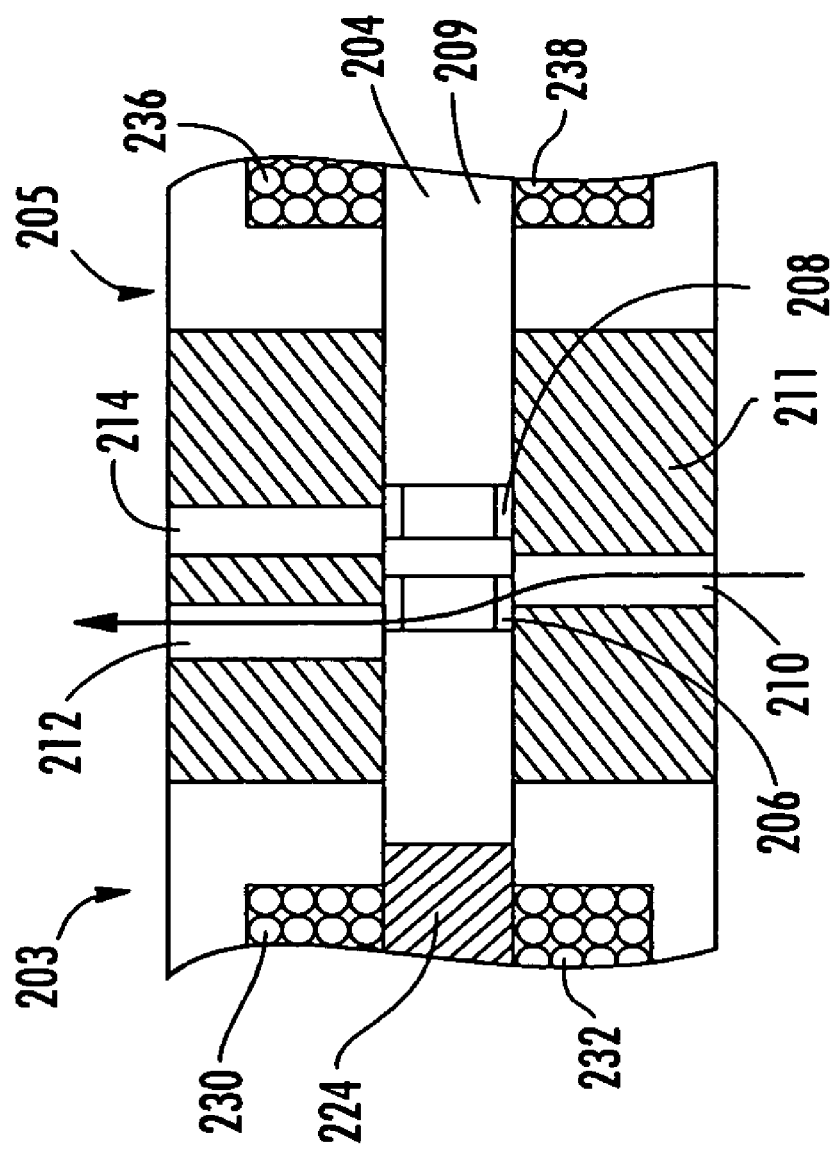
FIG. 7 is a schematic cross-sectional enlarged view of the spool valve of FIG. 6 in an open position.

The operation of spool valve 200 and method of the invention are described as follows. Spool valve 200 may operate as a 2-position, 3-position, or proportional valve. In one example, in order to operate as a 2-position valve, controller 260 sends signal A to magnetic field source 229 including electromagnetic coils 230 and 232, generating magnetic field H1' transverse to longitudinal axis 270 of actuator element 224. The re-orientation of the twins in magneto-active actuator element 224 causes actuator element 224 to extend in direction 256, driving spool 204 toward actuator element 226, and compressing actuator element 226. As shown in FIG. 7, this "full" actuation stroke of actuator element 224 will position spool 204, for example, such that flow port 210 is in communication with passage 206 in spool 204, and passage 206 is in communication with flow port 212. In this position, fluid is free to flow from port 210, through passage 206 in spool 204, and out flow port 212. The no-power hold feature, discussed above, locks spool 204 in this position even after magnetic field H1 is shut off.

Figure 6:
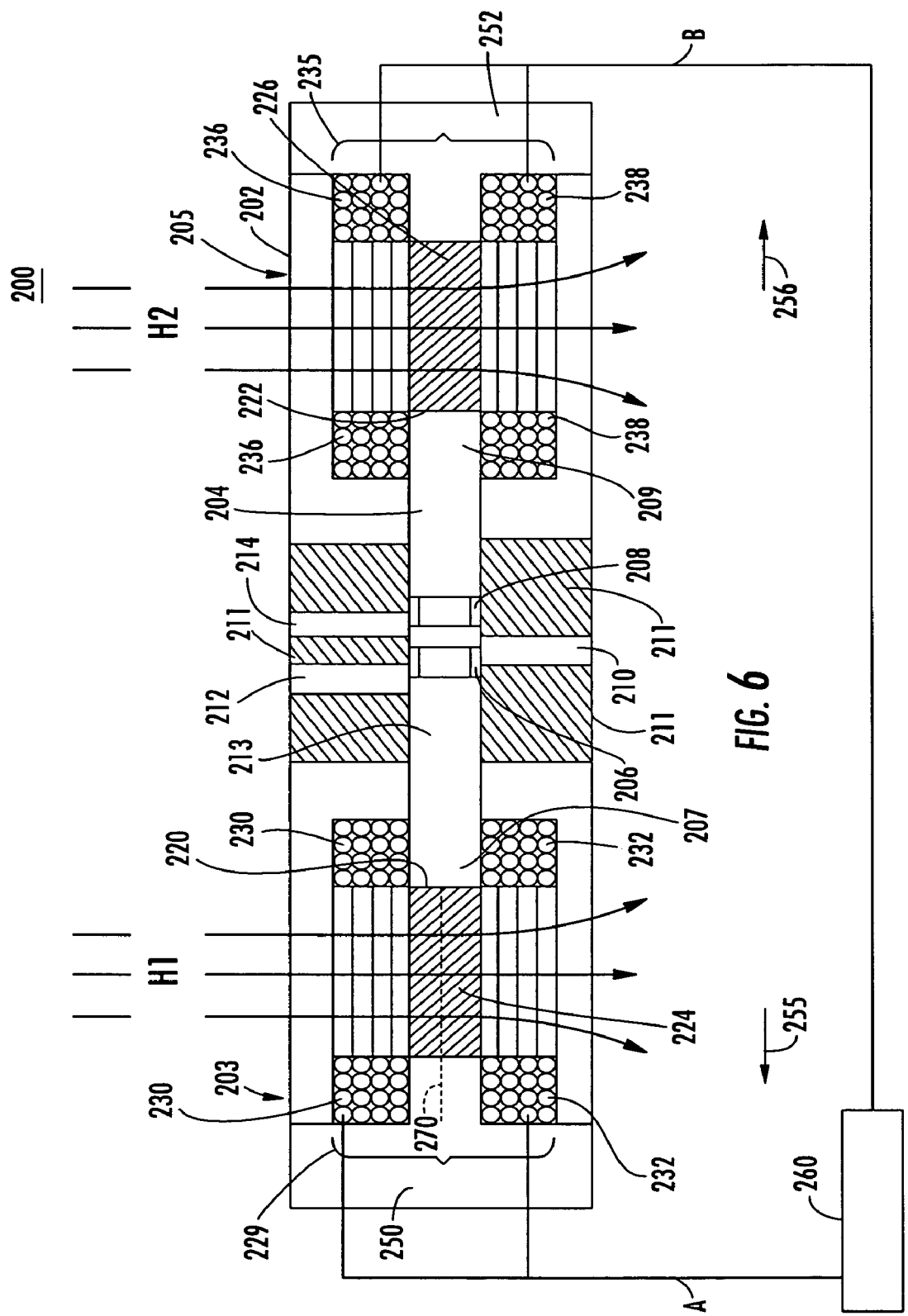
FIG. 6 is a schematic cross-sectional view of a spool valve in accordance with one specific embodiment of the present invention.
Figure 8:
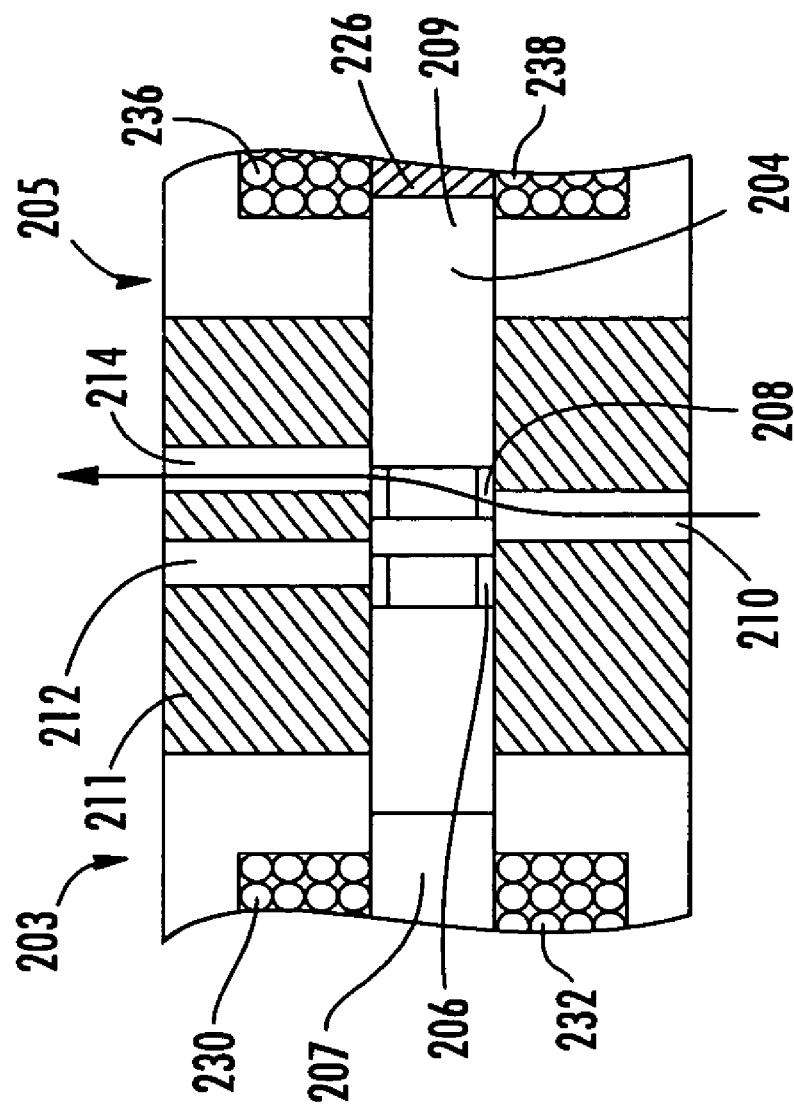
FIG. 8 is a schematic cross-sectional enlarged view of the spool valve of FIG. 6 in another open position.

In the second aspect of the 2-position valve example, controller 260, FIG. 6, sends signal B to the magnetic field source 235 which includes electromagnetic coils 236 and 238, to generate magnetic field H2. The re-orientation of the twin boundaries in magneto-active actuator element 226 causes actuator element 226 to extend in direction 255, driving spool 204 toward actuator element 224. In this position, FIG. 8, flow port 210 is in communication with passage 208 and passage 208 is in communication with flow port 214. Fluid is free to flow from port 210, through passage 208 in spool 204, and out flow port 214. The no-power hold feature, discussed above, locks spool 204 in this position even after magnetic field H2 is shut off.

Figure 9:
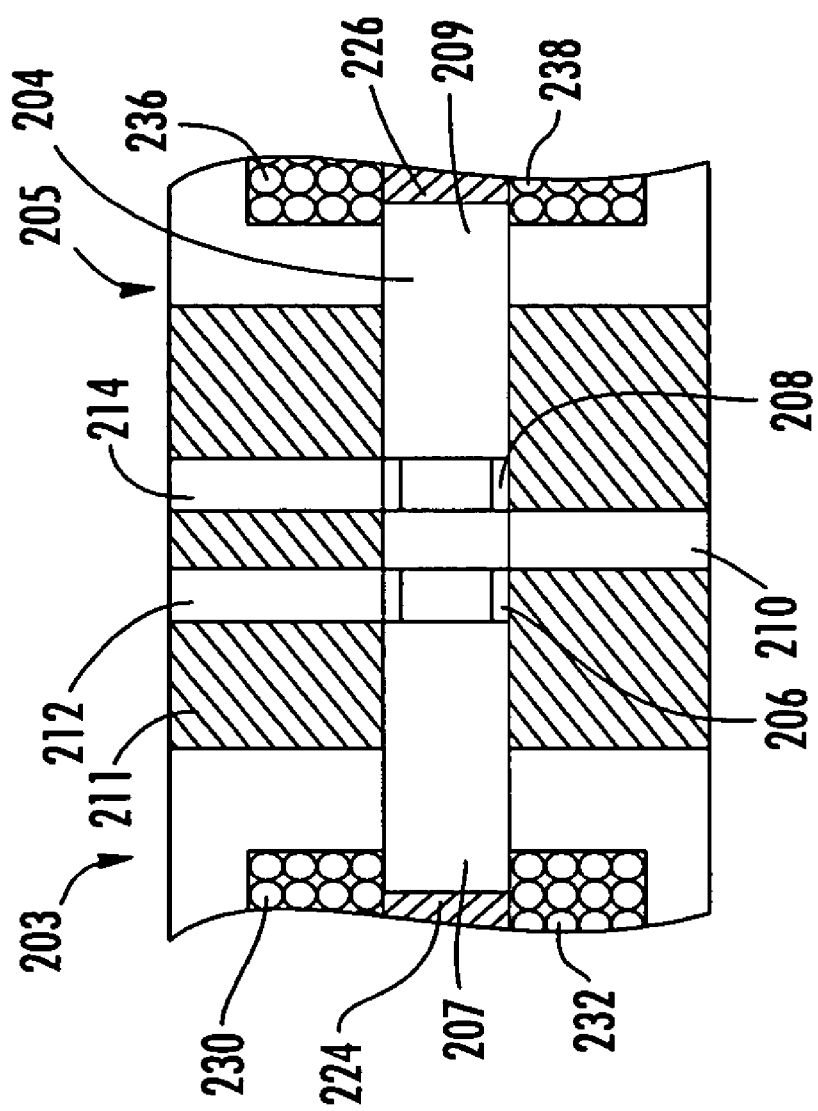
FIG. 9 is a schematic cross-sectional enlarged view of the spool valve of FIG. 6 in a closed position.
Figures 10A, 10B, 10C, 10D:
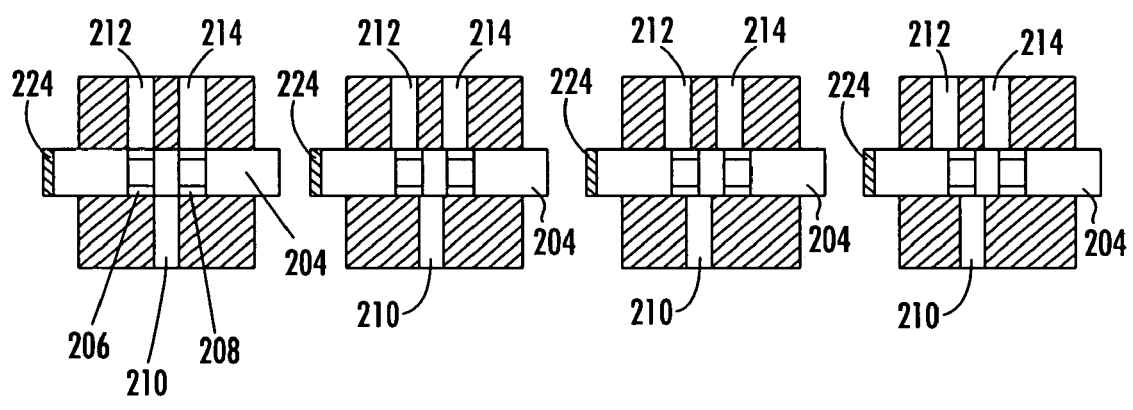
FIGS. 10A-D are schematic cross-sectional enlarged views of the spool of FIG. 6 positioned at points between the extremes of the displacement range.

For a 3-position valve, a third position, other than open or shut, is possible. In this example, controller 260, FIG. 6, sends signals A and B to both magnetic fields sources 229 and 235, including electromagnetic coils 230, 232 and 236, 238, to generate magnetic fields H1 and H2 simultaneously. This causes spool 204 to be centered over its displacement range, as shown in FIG. 9, to block any flow from port 210 from entering spool passages 206 or 208. No fluid is flowing through the valve in this arrangement.

For a proportional valve, the magnitude of the applied magnetic fields H1 and H2 controls the displacement of spool 204 such that, for example, spool passage 206 (and likewise spool passage 208) may be positioned at any point between the extremes of the displacement range, as shown in FIGS. 10A-D, by increasing the levels of magnetic field H2.

Figure 11:
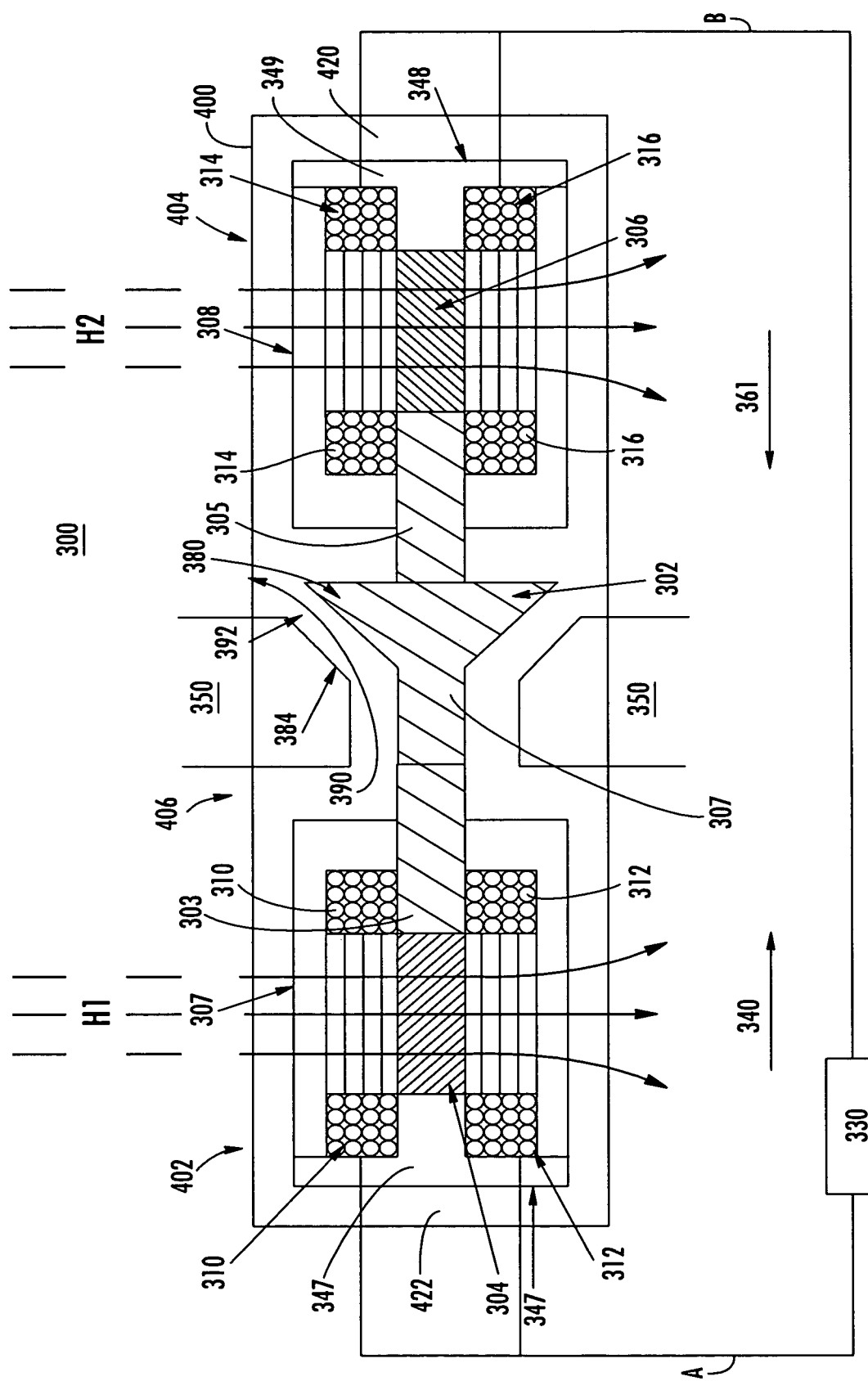
FIG. 11 is a schematic cross-sectional view of a poppet valve in accordance with another embodiment of the subject invention.

In another embodiment, poppet valve system and method 300, FIG. 11 operates similarly to spool valve 200 described herein. Poppet valve 300 includes control element or valve body 302, such as a poppet, and actuators or actuator elements 304 and 306 on opposing ends thereof. Actuator elements 304 and 306 are comprised of magneto-active twinned material configured to permit movement of twin boundaries therein. A magnetic field source subsystem includes, for example, magnetic field sources 307 and 308. In a preferred embodiment, magnetic field sources 307 and 308 provide magnetic fields to actuator elements 304 and 306, respectively, and may include electromagnetic coils 310 and 312, and 314 and 316, respectively. When controller 330 provides signal A to magnetic field source 307, magnetic field H1 is generated transverse to actuator element 304, thus expanding actuator element 304 longitudinally in direction 340 to drive control element 302 toward actuator element 306, compressing actuator element 306. End cap or stopper 347 inhibits extension of actuator element 304 in direction 361 when actuator element 304 is subjected to magnetic field H1, and end cap 349 inhibits actuator element 306 from moving in direction 340 when control element 302 is driven toward actuator element 306, and thus actuator element 306 is compressed. When valve head 380 of control element 302, which may be beveled, seats in valve seat 384 of stopper element 350 fluid flow 390 through channel 392, for example, is blocked.

Conversely, controller 330 may send signal B to magnetic field source 308 with its electromagnetic coils 314 and 316, generating magnetic field H2 through actuator element 306. Actuator element 306 extends in direction 361, with end cap 349 serving to prevent movement of actuator element 306 in direction 340. At full actuation stroke, valve head 380 of control element 302 moves in direction 340, away from valve seat 384 of stopper element 350. In this event, flow 390 through channel 392 is open. Also, when magnetic field sources 307 and 308 are both activated control element or poppet 302 can be positioned in a neutral position, thus allowing some flow through channel 392. Also, if magnetic field sources 307 and 308 are proportionally controlled, poppet 302 can be in one of any number of positions for controlling the amount of flow. Additionally, a housing (not shown), which may include flow ports for example, may be disposed about the poppet 302, stopper element 350, and actuator elements 304 and 306, as well as about magnetic field sources 307 and 308.

Similarly to the embodiments described above, housing 400 includes portions 402 and 404 where housing portions 402 and 404 are configured about magnetic field sources 307 and 308 which includes electromagnetic coils. Preferably, housing portions 402 and 404 are comprised of magnetic material, such as high permeability silicon iron, while housing portion 406 that surrounds poppet 302 can be any suitable material including composite material. In one embodiment, portion 406 is comprised of heat treatable carbon steel. Also, portions 303 and 305 of poppet 302 that project into magnetic fields H1 and H2, and end caps 420 and 422, are preferably comprised of non-magnetic material, such as aluminum, non-magnetic stainless steel, titanium, or a nickel-based alloy. Portion 307 of poppet 302 that does not project into magnetic fields H1 and H2 may be comprised of any suitable material, including composite material. It can be seen that poppet 302 may be comprised of different materials and portions. In one embodiment, poppet 302 may be monolithic and comprised of aluminum.

In accordance with the description of the operation of the position control actuator and spool valves herein, it can be seen that the operation of poppet valve 300 may controlled in a similar manner, using varying magnetic fields H1 and H2 such that channel 392 may be open, closed, or proportionally controlled, thus regulating the amount of fluid flow 390, if any, through channel 392.

The subject invention results in a position control actuator and method useful in valves or in many different devices other than spool, poppet or other valve types. By the nature of an antagonistic actuator arrangement, one actuator or actuator element is used to provide position control, while at the same time providing the compressive return stress required for the other actuation element. Also, both actuator elements provide position control, with each providing the compressive return stress required by the other. No power is required to keep the control element in a specific position, and the control element can provide a means for position feedback. The position control actuator of this invention thus provides accurate proportional position control, no-power hold, and low power consumption resulting in an improved, more less expensive system.

It will be understood by those of ordinary skill in the art that the embodiments described herein are not the only embodiments, and that elements described may be monolithic or constitute multiple parts. Also, actuator elements described as aligned and in direct contact with a control element or other elements also do not constitute necessary limitations of the invention. There may be space, other material or additional devices between actuator elements and the control element, or between the actuator element and end caps. Moreover, the control element and actuators may be arranged such that the control element and the actuators are neither directly connected nor linear with respect to one another, but at an angle with respect to one another.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

What is claimed is:

1. A position control actuator system comprising:
   a control element;
   first and second actuators each comprising magneto-active twinned material;
   the first actuator configured to extend and drive said control element in a first direction when said first actuator is subjected to a magnetic field;
   the second actuator configured to extend and drive said control element in a second direction when said second actuator is subjected to a magnetic field; and
   a magnetic field source subsystem configured to:
      extend the first actuator to drive the control element in the first direction, and
      extend the second actuator to drive the control element in the second direction; and
   a processor configured to determine the position of the control element based on inductance of one of said actuators, in which said processor applies a voltage input step signal to at least one magnetic field source in said magnetic field subsystem and measures electrical current time response of said at least one magnetic field source to determine said inductance.

* * * * *